United States Patent [19]

Leduc

[11] Patent Number: 4,905,660
[45] Date of Patent: Mar. 6, 1990

[54] AUXILIARY IGNITER SHIELD FOR GAS GRILLS

[76] Inventor: Walter J. Leduc, 3821 Fee Fee Rd., St. Louis, Mo. 63044

[21] Appl. No.: 389,129

[22] Filed: Aug. 3, 1989

[51] Int. Cl.⁴ .......................... A47J 37/00; F24C 3/00
[52] U.S. Cl. ................... 126/41 R; 431/263; 431/264
[58] Field of Search ............... 126/41 R, 25 R, 25 A, 126/25 B, 42, 39 K, 39 R, 512; 431/263, 264, 265, 259, 191, 192; 99/450, 444, 425, 447; 317/98

[56] References Cited

U.S. PATENT DOCUMENTS

| | | | |
|---|---|---|---|
| 3,139,558 | 6/1964 | Lindberg | 317/98 |
| 3,667,449 | 6/1972 | Persinger | 126/25 R |
| 3,729,288 | 4/1973 | Berlincourt | 431/264 |
| 3,823,345 | 7/1974 | Mitts et al. | 317/98 |
| 3,967,613 | 7/1976 | Rybak et al. | 126/41 R |
| 4,140,049 | 2/1979 | Stewart | 126/25 R |
| 4,188,937 | 2/1980 | Baynes | 126/41 R |
| 4,266,930 | 5/1981 | Leonard et al. | 431/263 |
| 4,288,210 | 9/1981 | Leonard et al. | 431/263 |
| 4,381,758 | 5/1983 | Svekis et al. | 126/41 R |
| 4,582,475 | 4/1986 | Hoppie | 431/264 |

*Primary Examiner*—James C. Yeung
*Attorney, Agent, or Firm*—Grace J. Fishel

[57] ABSTRACT

An auxiliary igniter shield for a gas grill having an igniter element for lighting the main burner, a grate for supporting heat resistant lava rocks or the like and a cooking grill in an enclosure. The igniter shield is a plate, slightly longer and wider than the igniter element above which it is hung upon suitable support means from the grate. The plate is preferably arcuate in cross section and hung from the grate at such distance to minimize cold spots on the cooking grill.

8 Claims, 2 Drawing Sheets

AUXILIARY IGNITER SHIELD FOR GAS GRILLS

BACKGROUND OF THE INVENTION

The present invention relates to an auxiliary shield to protect the electric igniter of a gas grill from drippings.

Conventional spark igniters for gas burners include a flash tube having electrodes associated therewith. The flash tube is positioned adjacent a gas burner for receiving gas from the burner which mixes with air to form a combustible mixture. Creation of a spark across the electrodes ignites the mixture in the flash tube to produce a flame which ignites the gas burner.

The electrodes are typically shielded to keep fat, meat juices and other drippings off but the shielding is inadequate in existing models because of the concurrent design requirement that the flash tube open out to the burner. In practice, the igniter must be periodically removed and cleaned with dish soap and a small brush. It is clear, however, that this act negates much of the convenience of a gas grill.

In view of the above, there is a need for an auxiliary igniter shield for gas grills which more perfectly protects the electrodes from drippings but which does not interfere with the function of the igniter. It is therefore an object of the present invention to provide such a shield. Other objects and features of the invention will be in part apparent and in part pointed out hereinafter.

The invention accordingly comprises the constructions hereinafter described and their equivalents, the scope of the invention being indicated in the following claims.

SUMMARY OF THE INVENTION

An auxiliary igniter shield for a gas grill having an igniter element, a grate for supporting heat resistant lava rocks or the like and a cooking grill is formed from a plate, preferably arcuate in cross section, which is suspended by support means from the grate above the igniter element, preferably at such distance to minimize cold spots on the cooking grill.

BRIEF DESCRIPTION OF THE DRAWINGS

In the accompanying drawings, in which one of various possible embodiments of the invention is illustrated, corresponding reference characters refer to corresponding parts throughout the several views of the drawings and in which.

DETAILED DESCRIPTION OF THE INVENTION

Figure 1:
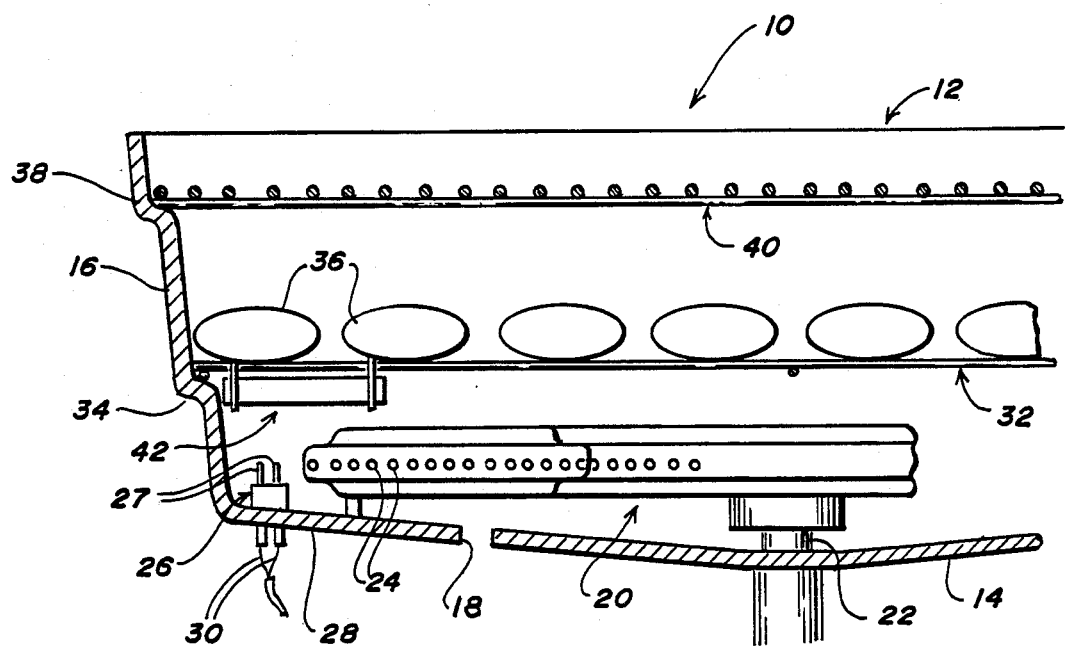
FIG. 1 is a sectional view taken along line 1—1 in FIG. 2 showing an auxiliary igniter shield in accordance with the present invention in use above an igniter.

Referring to the drawings more particularly by reference character, reference numeral 10 refers to a gas fired outdoor cooking apparatus suitable for use with natural gas, propane or the like. The apparatus comprises a cooking enclosure 12 having a bottom wall 14 and generally vertical side and end walls 16. The bottom wall 14 is provided with a plurality of openings 18, which may be arranged in any suitable pattern, to admit combustion air during operation.

As illustrated in FIG. 1, a gas burner 20 is connected to a gas pipe 22 which extends downwardly from the burner through bottom wall 14 to a main supply of fuel gas (not shown). The burner 20 is provided with flame apertures 24 which direct the flame jets laterally.

An igniter element 26 is located in the flame issuing from burner 20 and is electrically connected to a pair of electrodes 27 that are fixed in a casing 28. The other end of electrodes 27 are connected to a pair of lead wires 30 for connection to an electrical voltage source (not shown).

The numeral 32 denotes a grate which rests upon a support such as ledge 34 along the inner face of side and end walls 16. Grate 32 is positioned above burner 20 and supports heat-resistant lava rocks 36 or the like. Further supports such as ledge 38 are provided at a higher level along the inner face of side and end walls 16 for supporting a cooking grill 40.

Figure 4:
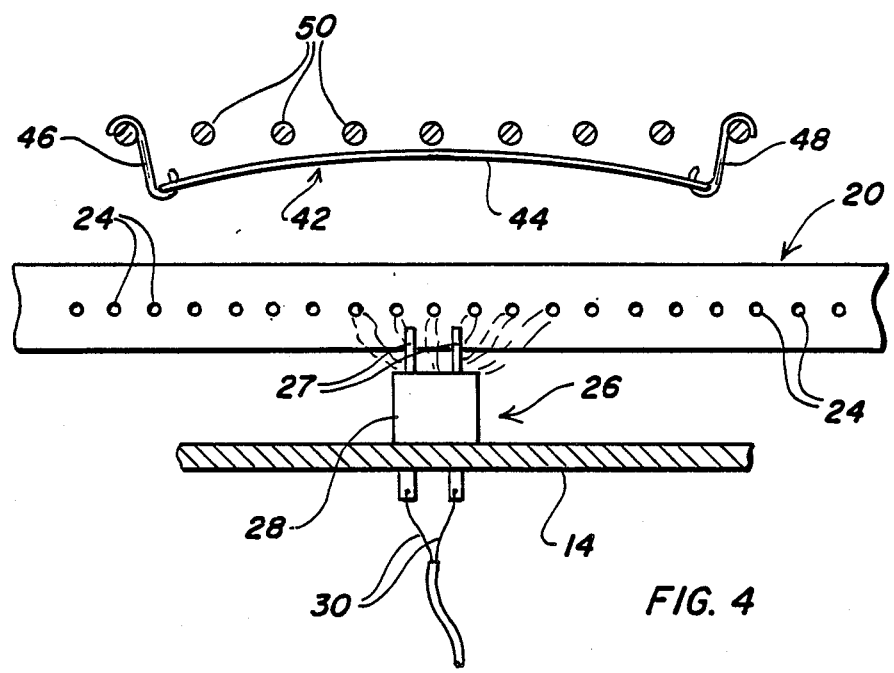

Reference numeral 42 refers to an igniter guard in accordance with the present invention. As illustrated in the drawings, igniter guard 42 comprises a plate 44 which is slightly longer and wider than igniter element 26 above which it is positioned. Without being bound to specifics, suitable guards for use with a wide range of existing models of gas grills measure about 4 by 3 inches and are formed from 0.030 inch galvanized metal. The plate is supplied flat but can be given an arcuate configuration by the user as shown in FIG. 4 such that drippings are directed away from igniter element 26.

Means 46 for suspending plate 44 from grate 32 are provided for positioning the igniter guard just above igniter element 26 and below grate 32. To avoid cold spots on cooking grill 40, it is preferred that means 46 position plate 44 within about 1" to 1½" from grate 32. Especially favorable results have been obtained when plate 44 is within 1⅛" from grate 32. Suitable means 46, as shown in the drawings, include S-hooks 48 hooked into holes 49 provided in the four corners of plate 44 and around bars 50 of grate 32.

Figure 2:
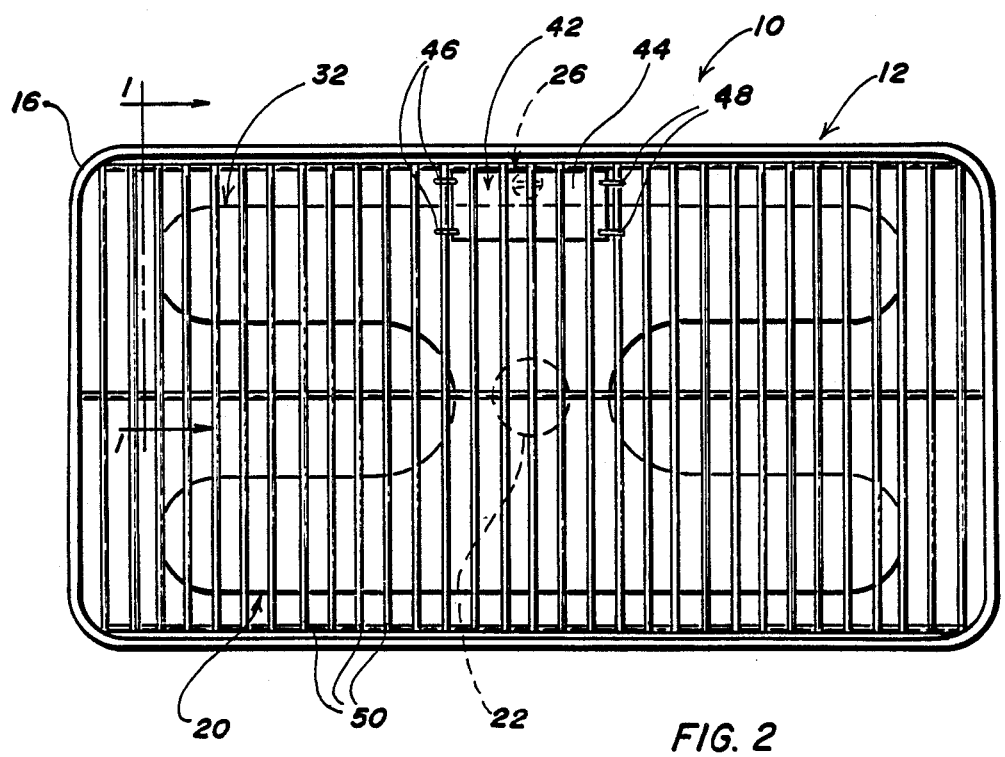
FIG. 2 is a plan view of the igniter shield installed in a gas grill.

In use, cooking grill 40 and grate 32 are removed from cooking apparatus 10. In a previously used grill, igniter element 26 is removed, cleaned with dish soap and a small brush, rinsed with clean water, dried and reinstalled. As best seen in FIG. 2, igniter guard 42 is then suspended from grate 32 on means 46 just above igniter element 26 and cooking grill 40 reinstalled. For best results, igniter guard 42 is positioned as close as possible to grate 32 to avoid cold spots on cooking grill 40.

Figure 3:
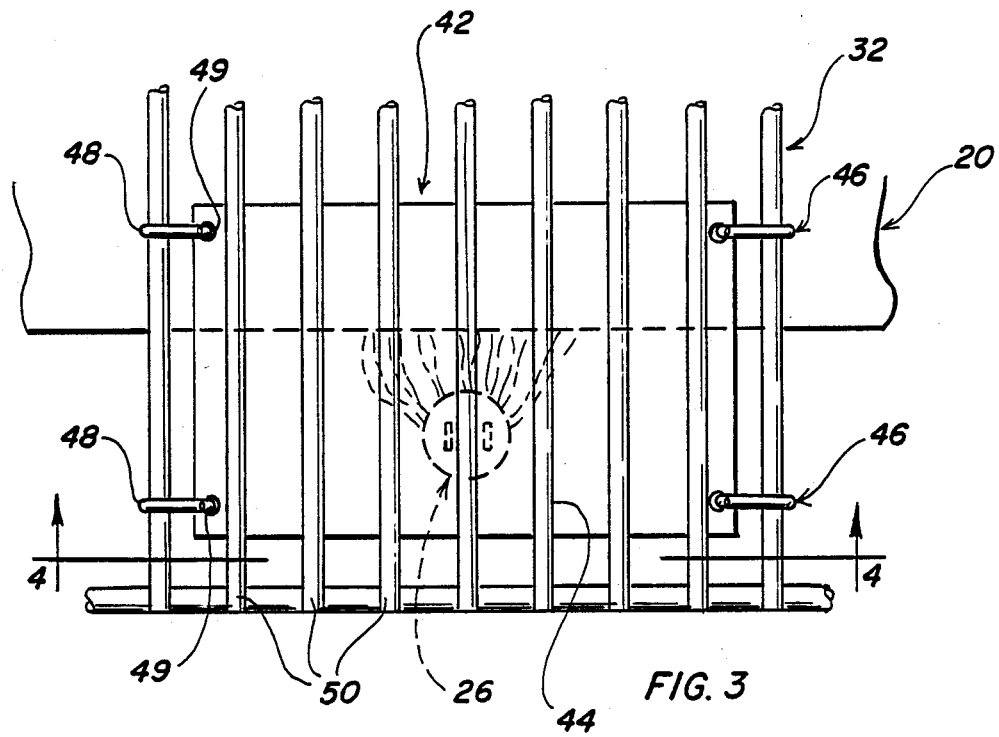
FIG. 3 is an enlarged plan view of the igniter shield in use above an igniter; and, FIG. 4 is a side view taken along line 4—4 in FIG. 3.

Thereafter, the user opens the main supply of fuel gas such that gas issues from burner 20 through apertures 24. The gas expands and mixes with air in igniter element 26 and, almost immediately, the user actuates the electrical voltage source resulting in an arc between electrodes 27. As shown in FIGS. 3 and 4, the resulting arc between electrodes 27 ignites the admixed gas and air in igniter element 26 which then ignites the gas issuing from burner 20. During cooking igniter guard 42 shields igniter element 26 from drippings and electrodes 27 from being fouled such that the grill can be fired multiple times without removing igniter element 26 for cleaning.

In view of the above, it will be seen that the several objects of the invention are achieved and other advantageous results attained. As various changes could be made in the above constructions without departing from the scope of the invention, it is intended that all matters contained in the above description or shown in the accompanying drawings shall be interpreted as illustrative and not in a limiting sense.

What is claimed is:

1. An auxiliary igniter shield for a gas grill having an igniter element, a grate for supporting heat resistant lava rocks or the like and a cooking grill, said igniter shield comprising a plate which is slightly longer and wider than the igniter element above which it is positioned and having support means for suspending the plate from the grate just above the igniter element and below the grate.

2. The auxiliary igniter shield of claim 1 wherein the plate is arcuate in cross section.

3. The auxiliary igniter shield of claim 1 wherein the means for suspending the plate space it from the grate at such distance to minimize cold spots on the cooking grill.

4. The auxiliary igniter shield of claim 3 wherein the means for suspending the plate comprise a plurality of S-hooks for attachment to holes in the corners of the plate and for attachment to the grate.

5. A gas grill having an igniter element, a grate for supporting heat resistant lava rocks or the like, a cooking grill and an igniter shield, said igniter shield comprising a plate which is slightly longer and wider than the igniter element above which it is positioned and having support means for suspending the plate from the grate just above the igniter element and below the grate.

6. The gas grill of claim 5 wherein the plate is arcuate in cross section.

7. The gas grill of claim 5 wherein the means for suspending the plate space it from the grate at such distance to minimize cold spots on the cooking grill.

8. The gas grill of claim 7 wherein the means for suspending the plate comprise a plurality of S-hooks for attachment to holes in the corners of the plate and for attachment to the grate.

* * * * *